United States Patent [19]

Glatzel et al.

[11] Patent Number: 4,832,523
[45] Date of Patent: May 23, 1989

[54] BALL JOINT

[75] Inventors: Michael Glatzel, Düsseldorf; Willy Blumberg, Meerbusch, both of Fed. Rep. of Germany

[73] Assignee: TRW Ehrenreich GmbH & Co. KG, Dusseldorf, Fed. Rep. of Germany

[21] Appl. No.: 179,514

[22] Filed: Apr. 8, 1988

[30] Foreign Application Priority Data

Apr. 11, 1987 [DE] Fed. Rep. of Germany ....... 3712460

[51] Int. Cl.⁴ .............................................. F16C 11/06
[52] U.S. Cl. ..................................... 403/134; 403/50; 277/212 FB
[58] Field of Search .......................... 403/134, 50, 51; 277/212 FB

[56] References Cited

U.S. PATENT DOCUMENTS

| | | | |
|---|---|---|---|
| 3,387,870 | 6/1968 | Gottschald et al. | 403/51 |
| 3,547,453 | 12/1970 | Gottschald | 277/212 FB |
| 4,549,830 | 10/1985 | Mette | 403/51 X |
| 4,572,693 | 2/1986 | Nemoto | 403/50 X |
| 4,673,188 | 6/1987 | Matsuno et al. | 277/212 FB |

FOREIGN PATENT DOCUMENTS

| | | |
|---|---|---|
| 1764871 | 4/1958 | Fed. Rep. of Germany . |
| 1961833 | 6/1967 | Fed. Rep. of Germany . |
| 2135299 | 1/1973 | Fed. Rep. of Germany . |
| 2752456 | 5/1979 | Fed. Rep. of Germany . |
| 3341993 | 6/1985 | Fed. Rep. of Germany . |

Primary Examiner—Andrew V. Kundrat
Attorney, Agent, or Firm—Tarolli, Sundheim & Covell

[57] ABSTRACT

A ball joint sealing bellows (7) made of a plastic material and having a stud-side bellows rim (8) sealingly engaging a ball stud (5) and a housing-side bellows rim (10) fixed by a clamping ring (11) in a circumferential groove (12) in a joint housing (1), the housing-side bellows rim (10) being approximately cylindrical and having an inner diameter which is somewhat greater than the outer diameter of the circumferential groove (12), the housing-side bellows rim being pressed under the preload of the clamping ring (11) which engages the outer surface of the rim, radially into the ring groove (12) and sealingly engaging the joint housing (1) to prevent the sealing bellows (7), from being pulled or pushed out of the ring groove (12), the housing-side bellows rim (10) having one circumferential thickening (15) on the axially outer side thereof which abuts one side surface of the clamping ring (11), and another circumferential thickening (17) on the axially inner side thereof which abuts the other side surface of the clamping ring (11).

11 Claims, 1 Drawing Sheet

BALL JOINT

The invention relates to a ball joint comprising a rotatable or pivotable ball stud projecting out of a ball joint housing. The opening between the joint housing and the stud is closed by a plastic sealing bellows having a stud-side rim sealingly engaging the stud and a housing-side rim located in a circular groove extending around the joint housing. The bellows is secured in the groove by a clamping ring that engages the outer surface of the housing-side rim. The housing-side rim of the bellows has an approximately cylindrical shape and has an inner diameter which is somewhat greater than the outer diameter of the circular groove of the housing. The housing-side rim is pressed radially into the circular groove by the clamping ring and sealingly engages the joint housing.

German Utility Model No. 1,764,871 (see FIG. 2 and claim 1) discloses a dust-protective cap for a ball joint. The cap has a cup-shape, is received in a groove of a ball joint housing and is attached to the housing by a wire fastening ring. However, the housing-side rim of the cap has no thickening which would lie against a side surface of the clamping ring. The reinforcing bead discussed on page 1, paragraph 5 and page 2, paragraph 1 of this publication and which the publication, by the way, seeks to avoid, is arranged on the inner circumference of the cap engaged by the fastening ring to prevent cutting of the cap by the wire. Therefore, the thickening of the publication functions differently than the thickenings formed according to the present invention on the housing-side rim and which engage the side surfaces of the clamping ring.

German Utility Model No. 1,961,833 discloses, as shown in the drawing of the Utility Model an elastic sealing bellows with a housing side rim having a shape corresponding to the shape of a groove in a ball joint housing. The drawing appears to show that the housing-side bellows rim has an outer circumferential thickening extending in the axial direction of the sealing bellows. However, claim 1 of the Utility Model recites at the end that the "wall thickness (of the bellows) . . . up to the peripheral surface of the housing rim is constant", and this language implies that the housing-side rim of the bellows has a constant wall thickness.

German Patent Publication No. 2,135,299 discloses another ball joint in which the sealing bellows has, on its housing side, a rim shaped according to the shape of a housing groove and which is held fixed in the housing groove by clamping elements. As shown in FIG. 2 of the reference, the housing groove may also be a wedge-shaped groove.

German Pat. No. 3,341,993 discloses fastening of a sealing bellows to a joint housing, in which the housing-side bellows rim of the sealing bellows forms a circumferential fold which is arched outwardly and which, under the pressure of the clamping ring, extends into a circular groove of the joint housing so that an improved sealing effect is attained without increasing the clamping force of the clamping ring as compared with prior fastenings. But, the known sealing bellows rim cannot simply be positionied in the circular groove, since the rim has a profile adapted to the U-shape of the circular groove, and must be pressed into the circular groove before the mounting of the clamping ring. Moreover, the bellows rim is not protected against being pulled out of its position in the groove.

German Patent Publication No. 2,752,456 discloses a ball joint in which the sealing bellows is held, by its housing-side bellow rim, in a groove having a wedge profile formed by a support ring. With this sealing bellows, the housing-side bellow rim must also be pressed into its position in the wedge groove and the bellows is insufficiently secured against being pulled out of its position in the groove.

The object of the present invention is a ball joint having an improved fastening of the housing-side rim of the sealing bellows which rim can be more easily positioned relative to the housing groove before the positioning of the clamping ring and which is effectively secured against being pulled out of the circular groove.

According to the invention, the housing-side rim of the bellows is provided with circumferential thickenings on the axially outer and axially inner sides of the rim which engage opposite sides of the clamping ring respectively.

In a ball joint according to the invention, the housing-side rim of the sealing bellows has an approximately cylindrical shape before it is secured to the housing, and it can be easily positioned relative to the ring groove of a joint housing by being positioned adjacent the ring groove. This is possible without an appreciable force because the inner diameter of the cylindrical bellows rim is somewhat greater than the outer diameter of the ring groove. Then a clamping ring is pushed over the sealing bellows and, upon snapping, presses the housing-side bellows rim radially into the ring groove, and the rim sealingly engages the joint housing. Then, the circumferential thickenings on the housing-side bellow rim lie against the sides of the clamping ring. These thickenings cannot practically be pulled or pushed by a force acting in the direction of the stud axis, from between the clamping ring and the housing. The sealing bellows according to the invention is therefore simple to mount, and it is effectively prevented from being pulled or pushed out of the ring groove of the joint housing. Moreover, the sealing bellows can be "stuffed" with a greater preload into the ring groove because it is forced into the ring groove by radial contraction of the clamping ring, and more bellows material is pressed into the ring groove without clamping the position of the clamping ring in the groove.

In one preferred embodiment of the invention, the thickening of the housing-side bellows rim on the axial outer side thereof has an approximately wedge-shape cross-section with an increasing wall thickness in a direction toward the bellows rim, so that when the sealing bellows is mounted, the bellows rim is wedged between the clamping ring and the joint housing.

In another embodiment, the thickening of the housing-side bellows rims on the axially inner side thereof has an approximately wedge-shaped cross-section with a wall thickness increasing in a direction away from the end of the bellows, so that the bellows rim is wedged between both sides of the clamping ring and the joint housing.

In another embodiment, the circumferential ring groove of the joint housing is designed as a wedge groove so that a (additional) wedging effect can be exerted on the bellows rim. A wedge groove can be conveniently manufactured because it can be produced on a turntable. It is especially convenient when the wedge groove has an angle of 60° because then a 60° turntable can be used.

In another embodiment, the sum of the wedge angles of the two wedge-shape thickenings of the housing-side bellows rim of the sealing bellows is approximately equal to the angle of the wedge groove. This enables an ideal friction effect on the outer surfaces of the wedge-shaped thickenings to be obtained.

In another embodiment, the sealing bellows has, adjacent to the approximately cylindrical housing-side bellows rim, a circumferential inner lip for positioning the rim relative to the ring groove. The lip engages the end of the joint housing from which the ball stud projects. The lip positions the housing-side bellows rim during assembly relative to the ring groove, and when the sealing bellows is pressed into the ring groove by the clamping ring, the circumferential lip is drawn into engagement with the housing and, thus, an additional sealing effect is attained.

Finally, in one embodiment of the invention, the sealing bellows on its outer surface adjacent to the approximately cylindrical housing-side bellows rim, has one or more circumferential lips or beads which, when the sealing bellows is fastened to the housing, cover and sealingly engage the clamping ring on its outer sides and protect it against corrosion.

Other features and advantages of the subject invention will become clear from the description which follows and the drawings which show two preferred embodiments of a ball joint according to the invention having an improved fastening of the bellows to the joint housing. In the drawings:

FIG. 5 is the same partial cross-sectional view as Fig. 4 showing the clamping ring set in.

Figure 1:
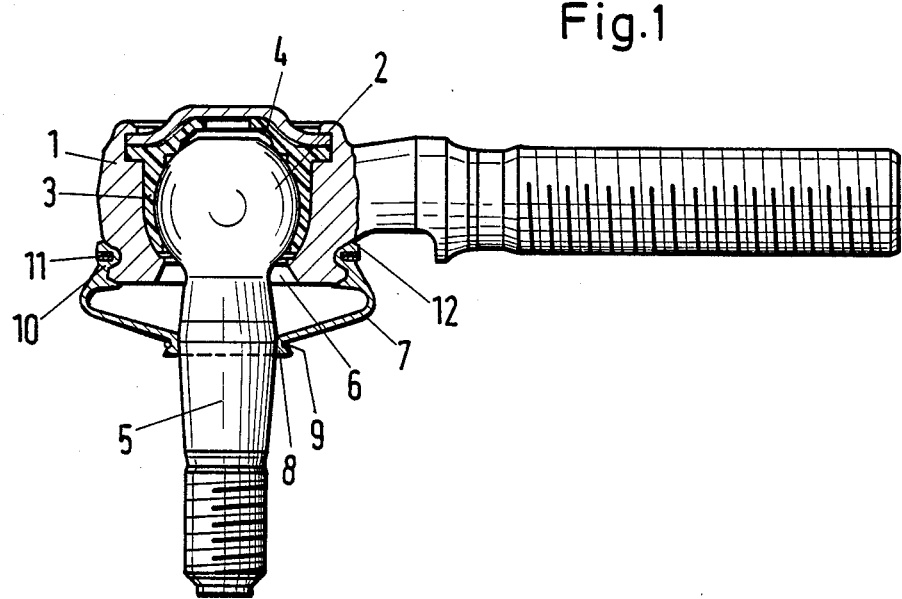
FIG. 1 is a longitudinal cross-section of a ball joint with a sealing bellows.

The ball joint of FIG. 1 comprises a housing 1 and a ball head 2, located in the housing for pivotal or rotatable movement therein. The ball head 2 is supported in the housing 1 by a bearing shell 3. Resilient spring projections 4 are formed on the cover side of the bearing shell 3. A stud 5 projects out of the joint housing. The deflection of the stud 5 is limited by the wall of an opening 6 of the joint housing 1.

The opening 6 is closed by a sealing bellows 7 made of plastic material and having a stud-side bellows rim 8 which sealingly engages the stud 5 and is pressed by a clamping ring 9 to the stud 5. A housing-side bellows rim 10 of the sealing bellows 7 is located in an annular groove 12 extending around the housing 1 and is sealingly attached to the housing by a clamping ring 11. The ring groove 12 is located adjacent to the end of the joint housing 1 which defines the opening 6 from which the stud 5 extends.

Figure 2:
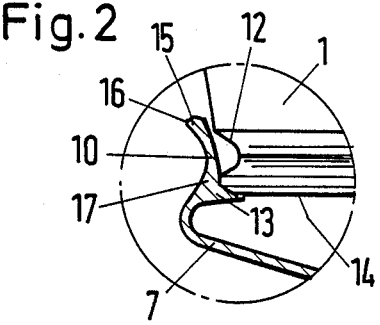
FIG. 2 is an enlarged partial cross-sectional view of the ring groove of the ball joint housing with a sealing bellows positioned relative to the joint housing but without a clamping ring.
Figure 3:
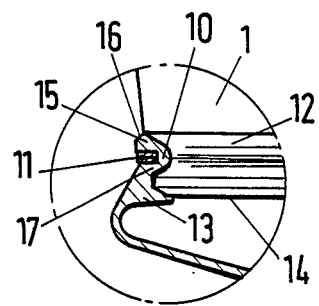
FIG. 3 is the same partial cross-section as FIG. 2 showing the clamping ring.

Details of the fastening of the housing-side bellows rim 10 to the joint housing 1 are shown in FIGS. 2 and 3. As shown, the ring groove 12 is a wedge-shaped groove with an angle of about 60° C. As shown in FIG. 2, the sealing bellows 7, during assembly is first positioned with its housing-side bellows rim 10 surrounding the ring groove 12. This can be easily done because the bellows rim 10 has an approximately cylindrical shape, and its inner diameter is somewhat greater than the outer diameter of the ring groove 12 which corresponds to the outer diamter of the adjacent portion of the joint housing 1. The positioning of the bellows rim 10 is further facilitating by the fact that the sealing bellows 7 has, adjacent to the approximately cylindrical bellows rim, a circumferential inner lip 13 adapted to engage an end surface 14 of the joint housing 1 which is located at the housing side from which the stud 5 projects.

The housing-side bellows rim 10 has a variable wall thickness. The housing-side belows rim 10 is provided with a circumferential first thickening 15 on the axially outer end thereof. The thickening 15 has a wedge-shaped cross-section which increases in wall thickness as it extends toward end 16 of the bellows.

Adjacent this first thickening 15, the bellows rim 10 has another circumferential thickening 17, which is located axially inward of the first thickening 15. The thickening 17 also has an approximately wedge-shaped cross-section, and its wall thickness increases as it extends away from the bellows end 16. The minimal wall thickness of the bellows rim 10 is between the thickenings 15 and 17 and immediately above the symmetrical plane of the ring groove 12.

The initial position of the housing-side bellows rim 10 is shown in FIG. 2. To fasten the housing-side bellows rim 10, the clamping ring which is spread, is pushed over the outer surface of the housing-side rim of the sealing bellows 7 until it lies in the plane of symmetry of the ring groove 12. Then the clamping ring 11 is released, it engages the outer surface of the housing-side bellows rim and presses the rim 10 radially into the ring groove 12 and into a sealing engagement with the joint housing 1.

FIG. 3 shows further that the wedge-shaped thickenings 15, 17 of the bellows rim 10 exactly fill the gap between the clamping ring 11 and the joint housing surfaces defining the ring groove 10, and converge toward the symmetrical axis of the ring groove 12. This is possible because the sum of the wedge angles of the two wedge-shaped thickenings 15, 17 corresponds approximately to the angle of the wedge ring groove 12. An optimal fastening assisted by the wedging effect of the housing-side bellows rim 10 in the ring groove 12 is attained.

When the clamping ring 11 presses the bellows rim 10 into the ring groove 12, in the bellows rim 10, tensile forces cause sealing engagement of the lip 13 with the end surface 14. Thus, in the ball joint according to the invention, a sealing surface is formed between the housing-side bellows rim 10 and the joint housing 1 which sealing surface practically extends from the bellows end 16 to the inner diameter of the lip 13.

Figure 4:
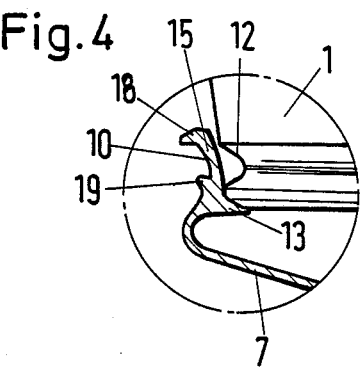
FIG. 4 is an enlarged partial cross-sectional view of the ring groove of the joint housing showing a sealing bellows having additional lips and beads but without a clamping ring.
Figure 5:
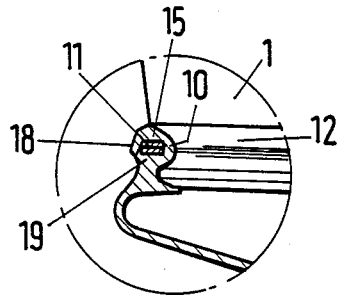

In the description of the embodiment shown in FIGS. 4 and 5 which follows, the parts corresponding to the embodiment described above have the same reference numerals. The housing-side bellows rim 10 located adjacent the ring groove 12, in FIG. 4, has only one circumferential thickening 15 on the outer side extending in the axial direction of the sealing bellows 7. Inwardly, there is provided a circumferential lip 13 for positioning the rim and for additional sealing.

Adjacent to the housing-side approximately cylindrical bellows rim 10, the sealing bellows 7 has on its outer surface a circumferential lip 18 and axially spaced therefrom, a circumferential bead 19. As shown in FIG. 4 of the drawing, the clamping ring can conveniently be placed between the lip 18 and the bead 19, because the lip 18 and the bead 19 initially extend approximately perpendicular to the approximately cylindrical bellows rim 10.

As shown in FIG. 5, the housing-side bellows rim 10 is pressed into the ring groove 12 by the clamping ring 11 so that the bead 19 lies against the lower end of the clamping ring 11, and the lip 18 covers the outer circumference of the clamping ring and protects it from corrosion. The thickening 15, as shown, is wedged between the ring groove 12 and the upper end of the clamping ring 11.

We claim:

1. A ball joint comprising:
   a joint housing (1) having a circumferential groove;
   a pivotable or rotatable ball stud (5) projecting from the joint housing;
   a sealing bellows (7) made of a plastic material for closing an opening (6) in the joint housing (1) through which the ball stud (5) extends, the sealing bellows (7) having a stud-side bellows rim (8) sealingly engaging the ball stud (5) and a housing-side bellows rim (10); and
   a clamping ring (11) engaging the outer surface of the housing-side bellow rim (10) to press it into the circumferential groove (12) in the joint housing (1);
   the housing-side bellows rim (10) being approximately cylindrical and having an inner diameter somewhat greater than the outer diameter of the groove (12), the housing-side bellows rim (10) being pressed by the clamping ring (11) which engages with a preload the outer surface of the housing-side bellows rim into the groove (12) and sealingly engaging the joint housing (1); characterized in that the housing-side bellows rim (10) has a first circumferential thickening (15) on the axially outer side thereof abutting one side surface of the clamping ring (11) and a second circumferential thickening (17) on the axially inner side thereof abutting another side surface of the clamping ring (11) so that both side surfaces of the clamping ring (11) are engaged by the thickenings (15, 17), the first axially outer thickening (15) of the housing-side bellows rim (10) having an approximately wedge-shaped cross section and a wall thickness which increases toward the bellows end.

2. A ball joint according to claim 1 characterized in that the second axially inner thickening (17) of the housing side bellows rim (10) has an approximately wedge-shaped cross-section and a wall thickness which increases away from the bellows end (16).

3. A ball joint comprising:
   a joint housing (1) having a circumferential groove;
   a pivotable or rotatable ball stud (5) projecting from the joint housing;
   a sealing bellows (7) made of a plastic material for closing an opening (6) in the joint housing (1) through which the ball stud (5) extends, the sealing bellows (7) having a stud-side bellows rim (8) sealingly engaging the ball stud (5) and a housing-side bellows rim (10); and
   a clamping ring (11) engaging the outer surface of the housing-side bellow rim (10) to press it into the circumferential groove (12) in the joint housing (1);
   the housing-side bellows rim (10) being approximately cylindrical and having an inner diameter somewhat greater than the outer diameter of the groove (12), the housing-side bellows rim (10) being pressed by the clamping ring (11) which engages with a preload the outer surface of the housing-side bellows rim into the ring groove (12) and sealingly engaging the joint housing (1); characterized in that the housing-side bellows rim (10) has a circumferential thickening on the axially outer side thereof which thickening, upon the bellows rim being positioned in the groove (12), is drawn into the groove (12) sealingly engaging the housing (1) and a side surface of the clamping ring (11); and
   the housing-side bellows rim (10) has another circumferential thickening (17) on the axially inner side thereof which thickening, upon the bellows rim being positioned in the groove (12), is drawn into the groove (12) sealingly engaging the housing (1) and a side surface of the clamping ring (11) so that both side surfaces of the clamping ring (11) are engaged by the thickenings (15, 17).

4. A ball joint according to claim 3, characterized in that the first axially outer thickening (15) of the housing-side bellows rim (10) has an approximately wedge-shaped cross-section and a wall thickness which increases toward a bellows end (16).

5. A ball joint according to one of claim 3 or 4, characterized in that the second axially inner thickening (17) of the housing-side bellows rim (10) has an approximately wedge-shape cross-section and a wall thickness which increases away from the bellows end (16).

6. A ball joint according to claim 3, characterized in that the first axially outer thickening (15) of the housing-side bellows rim (10) has an approximately wedge-shaped cross-section and a wall thickness which increases toward a bellows end (16), and the second axially inner thickening (17) of the housing-side bellows rim (10) has an approximately wedge-shape cross-section and a wall thickness which increases away from the bellows end (16).

7. A ball joint according to one of claim 3, 4 or 6, characterized in that the circumferential groove (12) of the joint housing (1) is a wedge-shape groove.

8. A ball joint according to claim 7, characterized in that the wedge groove has an angle of 60°.

9. A ball joint according to claim 7 as dependent on claim 6, characterized in that the sum of the wedge angles of the two wedge-shape thickenings (15, 17) of the housing-side bellows rim (10) of the sealing bellows (7) is approximately equal to the angle of the wedge groove.

10. A ball joint according to one of claim 3, 4 or 6, characterized in that the sealing bellows (7) has adjacent to the approximately cylindrical housing-side bellows rim (10), a circumferential lip (13) on the inner side thereof which abuts an end surface (14) of the joint housing (1) from which the ball stud (5) projects.

11. A ball joint according to one of claims 3, 4 or 6, characterized in that the sealing bellows (7) has adjacent to the approximately cylindrical housing-side bellows rim (10) and on its outer surface one or more circumferential lips (18) or beads (19) which, when the sealing bellows (7) is fastened, cover the clamping ring (11) outer side surfaces.

* * * * *